(12) United States Patent
Obrador et al.

(10) Patent No.: US 8,345,934 B2
(45) Date of Patent: Jan. 1, 2013

(54) METHOD FOR AUTOMATIC STORYTELLING FOR PHOTO ALBUMS USING SOCIAL NETWORK CONTEXT

(75) Inventors: Pere Obrador, Madrid (ES); Rodrigo de Oliveira, Madrid (ES); Nuria Oliver, Madrid (ES)

(73) Assignee: Telefonica, S.A., Madrid (ES)

( * ) Notice: Subject to any disclaimer, the term of this patent is extended or adjusted under 35 U.S.C. 154(b) by 23 days.

(21) Appl. No.: 13/098,801

(22) Filed: May 2, 2011

(65) Prior Publication Data

US 2012/0014560 A1 Jan. 19, 2012

Related U.S. Application Data

(60) Provisional application No. 61/365,520, filed on Jul. 19, 2010.

(51) Int. Cl.
*G06K 9/00* (2006.01)
(52) U.S. Cl. ........ 382/115; 382/100; 382/118; 382/155; 382/168; 382/224
(58) Field of Classification Search .................. 382/100, 382/115–118, 155–159, 168, 224, 305–307
See application file for complete search history.

(56) References Cited

U.S. PATENT DOCUMENTS

| | | | | |
|---|---|---|---|---|
| 7,587,069 B2 * | 9/2009 | Movellan et al. | ............. | 382/118 |
| 7,680,343 B2 * | 3/2010 | Covell et al. | ................... | 382/224 |
| 8,041,076 B1 * | 10/2011 | Bourdev | ........................ | 382/103 |
| 8,044,945 B2 * | 10/2011 | Takamori et al. | ............. | 345/204 |
| 8,212,834 B2 * | 7/2012 | Bogart et al. | .................. | 345/581 |
| 8,224,038 B2 * | 7/2012 | Aoki et al. | ..................... | 382/118 |
| 2006/0259863 A1 | 11/2006 | Obrador et al. | | |
| 2011/0026836 A1 * | 2/2011 | Ptucha et al. | ................. | 382/209 |
| 2012/0099783 A1 * | 4/2012 | Bourdev | ....................... | 382/159 |

FOREIGN PATENT DOCUMENTS

WO 2010/021625 A1 2/2010

* cited by examiner

*Primary Examiner* — Wesley Tucker
(74) *Attorney, Agent, or Firm* — Ladas & Parry LLP

(57) ABSTRACT

A method for automatically selecting and organizing a subset of photos from a set of photos provided by a user, who has an account on at least one social network providing some context, for creating a summarized photo album with a storytelling structure. The method comprises: arranging the set of photos into a three level hierarchy, acts, scenes and shots; checking whether photos are photos with people or not; obtaining an aesthetic measure of the photos; creating and ranking face clusters; selecting the most aesthetic photo of each face cluster; selecting photos with people until complete a predefined number of photos of the summarized album picking the ones which optimize the function:

$$O_f(C,C^*,S,C_{SN})=\alpha_f A_f(S)-\gamma_f d(H_{Character}(S)H_{Character}(C \cup C_{SN})-\delta_f d(H_{Act}(S),H_{Act}(C^*));$$

and then selecting non-people photos which minimize the following function $O_a$:

$$O_a(C^*,S)=d(H_{Act}(S),H_{Act}(C^*));$$

ordering all the selected photos in chronological order; and finally discarding all the photos which have not been selected.

4 Claims, No Drawings

METHOD FOR AUTOMATIC STORYTELLING FOR PHOTO ALBUMS USING SOCIAL NETWORK CONTEXT

CROSS-REFERENCE TO RELATED APPLICATION

This application claims the benefit of U.S. Provisional Patent Application Ser. No. 61/365,520 filed Jul. 19, 2010, the contents of which is incorporated herein by reference in its entirety.

DESCRIPTION

1. Technical Field of the Invention

The present invention relates generally to the composition of photo albums and more specifically to the summarization of photo albums taking into account social network context.

2. Background of the Invention

In recent years, and mainly due to the pervasiveness of digital cameras and camera-phones, there has been an exponential increase in the overall number of photos taken by users. This dramatic growth in the amount of digital personal media has led to increasingly large media libraries in local hard drives and/or online repositories, such as Flickr!, Picasa Web Album or Facebook. Unfortunately, large photo collections turn the manual task of selecting images into a tedious and time consuming process. In addition, the familiarity users have with the photos belonging to a specific event decay over time, turning the photo selection task more difficult with time. It can be said that information overload is one of today's major concerns.

On the other hand, the social narrative use of photos—i.e., photo storytelling—plays an important role in people's lives as it serves to structure and share personal and interpersonal experiences and to express personal and group identities. Hence, automatic approaches to personal photo collection summarization and event detection have been of interest in the research community.

Thus, in order to support users on selecting the best photos to create an online photo album, attention has been devoted to the development of automatic approaches for photo storytelling.

Automatic personal photo collection summarization for storytelling purposes is a very hard problem, since each end-user has very different interests, tastes, photo skills, etc. In addition, meaningful and relevant photo stories require some knowledge of the social context surrounding the photos, such as who the user and the target audience are.

Most of the prior art related to selecting and organizing photo albums relies on the information extracted from the photos to process only—either a personal collection, or a set of images retrieved from the web—by segmenting them into meaningful events, either for collection navigation or summarization, in which case representative images are selected from those events.

In prior art it can be found simple time clustering algorithms which start a new cluster if a new photo is taken more than a certain amount of time since the previous photo was taken. Clusters are merged based on content analysis until the desired number of clusters is reached. The photo in the center of the time cluster is selected as its representative image. Some improvements have been done by means of an adaptive temporal threshold and a new approach to select the representative image of each cluster (the most distinctive image in the Kullback-Leibler divergence sense).

Other automatic albuming systems summarize a photo collection by event detection using time clustering and sub-event clustering based on color similarity; in addition, very low quality images—with underexposure, low contrast and camera de-focus—are discarded. Or by presenting a browsing interface that exploits the capture time information in an adaptive way; the allocated space for each event is roughly proportional to the number of photos taken in that cluster, and the representative images for each event are selected by identifying very close or very distant images in time.

Additional unsupervised approaches have been proposed for event clustering using either temporal similarity or temporal and content similarity quantified at multiple temporal scales, and also for photo storytelling. In the latter, semantic keywords are extracted from the story and an annotated image database is searched. Unfortunately, users are typically reluctant to annotate images with text, and therefore such a system may not be suited to generate personal photo stories.

There has also been some work in web (i.e., Flickr) multiuser collection summaries. For instance, a solution for the problem of landmark summarization have been proposed using multi-user image collections from the Internet, and selecting a set of canonical views—by taking image likelihood, coverage and orthogonality into account—to form the scene summary. A similar approach have been achieved by adding location metadata, new visual features and a more sophisticated representative image selection by clustering the images into visually similar groups, and generating links between images that contain the same visual objects. And finally, some systems have started to incorporate the time and location information—i.e., GPS coordinates—to automatically organize a personal photo collection in a set of event and location hierarchies.

With the advent of photo and video capabilities in online social networking sites (OSN), an increasing portion of the users' social photo storytelling activities are migrating to these sites, where friends and family members update each other on their daily lives, recent events, trips or vacations. Hence, there are opportunities to mine existing photo albums in OSN in order to automatically create relevant and meaningful photo stories for users to share online.

There are some work in related areas that take advantage of the user's social context, as algorithms for improving a multimedia browser based on social metadata —i.e., places the users spend time at, and people they meet with—obtained via GPS traces of daily life routines. And also image value assessment algorithms that take into account social relationships between detected people in the photographs, where a higher weight is given to photos of close relatives and lower weight to the photos of, for instance, neighbors. Unfortunately the social relationships need to be entered manually by the user.

In previous researches, users typically enjoy the creative process involved in photo story creation and they rely heavily on emotional, aesthetics and contextual information in order to select images.

Unfortunately, none of these approaches addresses social aspects of these photo stories, such as its target audience.

SUMMARY OF THE INVENTION

The present invention serves to solve the aforesaid problem by providing a method for automatically selecting and organizing a subset of k photos, where k is a parameter defined by a user, from a set of photos provided by the user, who has an account on at least one social network, for creating a summarized photo album with a storytelling structure. The following steps are comprised by the invention:

arranging the set of photos into a three level hierarchy, acts, scenes and shots, performing the following steps:
checking difference between photo capture times;
including a photo into a new act if checked time is higher than a predefined time;
comparing images belonging to the same act with the others of said act analysing global color similarity;
photos belonging to the same act which are similar according to the comparison of the previous step, are considered as belonging to the same scene;
applying a scale-invariant feature transform algorithm to photos belonging to same scene for identifying near-duplicates photos;
photos belonging to the same scene which are near-duplicate photos according to the previous step, are considered as belonging to the same shot;
checking whether photos are people photos or non-people photos using a face detection algorithm;
if the photos are people photos, using an image aesthetic algorithm for people photos to obtain a face aesthetic measure, being a value equal to 0 the lowest aesthetic appealing and a value equal to 1 the highest aesthetic appealing, taking into account face sharpness, relative size of a face and smile detection of the photos;
if the photos are non people photos, using an image aesthetic algorithm for non-people photos to obtain an aesthetic measure, being a value equal to 0 the lowest aesthetic appealing and a value equal to 1 the highest aesthetic appealing, taking into account sharpness, contrast, colorfulness, exposure, isolation from the background and relative size of the appealing region in the photo;
detecting characters appearing in people photos by recognizing a same face in two or more photos, being these photos either in the set of photos provided by the user, or in the photo albums said user has posted in his social network;
selecting for the subset of photos the most aesthetic photo of each character, according to the face aesthetic measures obtained before;
selecting people photos for the subset of photos, from the set of photos, until reach n photos taking into account the photos already selected in the previous step, the photos maximize the following function $O_f$:

$$O_f(C,C^*,S,C_{SN}) = \alpha_f A_f(S) - \gamma_f d(H_{Character}(S), H_{Character}(C \cup C_{SN})) - \delta_f d(H_{Act}(S), H_{Act}(C^*));$$

wherein:
C=the set of photos;
$C^*$=C but selecting only the most aesthetic photo of each shot;
S=the subset of photos;
$C_{SN}$=all user's social network photos;
$\alpha_f, \gamma_f$ and $\delta_f$=weights for each term of the $O_f$ function;
$A_f(S)$=normalized face aesthetic measure;
$H_{Character}(S)$=user's character normalized histogram of the subset of photos, representing the frequency that each character appears in the subset of photos, being a character a person who appears more than one time in the set of photos and the user's social network photos, as detected by the face clustering algorithm;
$H_{Character}(C \cup C_{SN})$=user's character normalized histogram taking into account the set of photos and user's social network photos, representing the frequency that each character appears in the set of photos and in the user's social network photos, as detected by the face clustering algorithm;

$H_{Act}(S)$=normalized histogram of the acts of the subset of photos, representing a proportion of the number of photos of the acts in S respect the total number of photos of S;
$H_{Act}(C^*)$=normalized histogram of the acts of $C^*$, representing a proportion of the number of photos of the acts in $C^*$ respect the total number of photos of $C^*$;
d( )=normalized metric distance between histograms;
n=number of people photos desired;
selecting m non-people photos for the subset of photos, from the set of photos, the m photos minimize the following function $O_a$:

$$O_a(C^*,S) = d(H_{Act}(S), H_{Act}(C^*));$$

wherein:
m=k minus n;
ordering all the selected photos of the subset of photos in chronological order;
discarding all the photos of the set which have not been selected.

The method may select people photos for the subset of photos until reach n in the case of the number of character photos are less than n.

The method may select non-people photos for the subset of photos according to their aesthetic measure until reach n in the case of the number of people photos are less than n.

The number of people photos desired, also called n, may be obtained multiplying k by the proportion of people photos in user's social network photos and the set of photos.

The above features and advantages do not limit the present invention, and those skilled in the art will recognize additional features and advantages upon reading the following detailed description.

DETAILED DESCRIPTION OF THE INVENTION

The proposed invention is inspired by principles of dramaturgy and cinematography for creating a structure for the photo albums. Each generated summary, album or photo story[1] contains a set of elements that are described next, followed by a detailed description of the algorithms that compose the proposed invention.

3.1.1 Photo Story Elements

A good story includes essential elements such as a certain narrative structure, with identifiable beginnings, middles and ends, and a substantial focus on characters and characterization which is arguably the most important single component of the story. In the case of personal photo storytelling, users want to show off their experiences emphasizing good/happy times with friends and family, and aesthetic imagery.

3.1.1.1 Narrative Structure

The photos are grouped into meaningful events, which generate a certain narrative structure. The story is divided into a three level hierarchy of acts, scenes and shots. Since this three level hierarchy provides a good level of granularity, relatively non-sophisticated—and hence faster—clustering methods to detect the acts, scenes and shots are used.

1. Acts: An act is major section of a play (dramaturgy), in which all story elements are related to one another. This can be seen as a relatively large group of photos representing a well defined period in time. Users typically give some structure to their image collection by the temporal patterns (i.e., bursts) with which they take their photos. Hence, acts are detected by an algorithm where a photo is included into a new act if it was captured more than a certain amount of time $T_t$ since the previous photo was captured. Thus, a specific number of acts can be achieved just by varying $T_t$, which is an important feature as explained below.

The number of acts, $N_{ActClusters}$ into which the photo collection is partitioned depends on the average number of images per act $\overline{N_{Act}}$, and the overall number of images in the collection $N_C$:

$$N_{ActClusters} = \frac{N_C}{\overline{N_{Act}}}.$$

Given $N_C$ and $\overline{N_{Act}}$ the proposed act clustering algorithm varies the time threshold $T_t$ until the desired $N_{ActClusters}$ is reached. In the proposed embodiment, $\overline{N_{Act}}$=2.5, generates the best results.

2. Scenes: each act within a photo story is divided into scenes, in which the setting is fixed. In the present invention a scene is composed of images from one specific act that are similar to each other, using global color similarity.

3. Shots: finally, each scene is divided into shots—borrowing now from cinematography—which are single video sequences captured by one single camera without interruption. Each consecutive frame in a video shot is almost identical to the previous one, and therefore we use this term in our algorithm to refer to a set of near-duplicate photos—i.e., images that were taken from almost the same camera angle, with almost identical subjects in the scene.

It is followed a bottom-up approach to accomplish a hierarchical scene/shot representation. First, similar images within a specific act are clustered into shots using the normalized Scale-invariant feature transform (or SIFT), that is an algorithm to detect and describe local features in images. Next, only one image from each shot is selected using an aesthetic measure. All the pictures selected at the shot level are then clustered together using a global color similarity function (the normalized histogram intersection in HSV—hue, saturation, value—color space), generating the scenes for this particular act. Both shots and scenes may be composed of one single image.

The present invention proposes a similarity threshold that varies linearly with the difference between the photo's capture time, $\Delta T$. The similarity threshold is low for $\Delta T \ll \Delta T_{max}$, i.e., images taken close in time and similar to each other will be clustered together, whereas for $\Delta t \geq \Delta T_{max}$, the similarity threshold is 1, i.e., similarity does not apply. The time difference cap $\Delta T_{max}$ adaptive to the time duration of the act at hand:

$$\Delta T_{max} = \frac{1}{3} ActDuration.$$

This approach is applied to both scene and shot clustering.

3.1.1.2 Characters

The characters in the story are probably its most important element. Hence, it is not surprising that users tend to be very sensitive to the selection of characters in their social photo stories. For photo albums to be shared on OSN, users tend to give priority to photos with members of their social network.

The invention takes into account three character related features: (1) Face ratio: the proportion of images with people, people photos[2], that should appear in the story; (2) characters: who should be the people in the pictures; and (3) aesthetics: the aesthetic value of the characters' faces in the photos where they appear, including whether they are smiling or not.

Since the goal of our method is to help users create photo stories that will be shared on their OSN, two sources of information are used to determine the target face ratio and the characters in the story: The set of photos in the user's OSN albums ($C_{SN}$) and the specific photo collection to be summarized (C). This allows the invention to approximate the user's style—i.e., average face ratio in an album, which it is found to be a very personal trait—and adapt to the target audience—i.e., friends that appear prominently in the user's albums are probably socially closer, and therefore they are favored in future summaries.

The face ratio is given by the ratio of number of people photos in a collection when compared to the total number of photos in that collection. Since different photo collections do not necessarily have the same face ratios, i.e., the user may have lots of people images in one collection and barely any in another collection, the target face ratio in the photo story, $F_r$, is given by a linear combination of the face ratios in $C(f_r(C))$ and in $C_{SN}(f_r(C_{SN}))$. In this way it is reached a compromise between the user's social storytelling style and the actual collection to summarize.

In addition, a specific photo collection to be summarized does not necessarily include photos from all the people that are relevant to the user (e.g. family, friends). In order to identify the main story characters, the method of the invention combines $C_{SN}$ and C into a single photo collection $\{C \cup C_{SN}\}$, which are used to identify the user's character set by clustering the faces using a face detection and recognition engine. Each face cluster that has at least two images is considered relevant enough to correspond to a character important to the user. This gives a good estimation of the people the user cares about. For instance, one of these relevant people may appear only once in C but many times in $C_{SN}$ and hence the invention would include that person as a character in the summary. In addition, the importance of the characters is inferred from the number of images in each face cluster.

Finally, the aesthetic value of the people photos is also computed as described below.

3.1.1.3 Aesthetics

Users typically share images of important events, relevant characters, or images that may be important to them mainly for aesthetic reasons. In addition, if a low quality photograph is selected to summarize an event, it will not be a mnemonic for the user to remember that event. Prior work in computational image aesthetics has focused on automatically classifying aesthetic vs. non-aesthetic images. However, in the case of image selection it makes more sense ranking the images within a cluster rather than classifying them. Hence, in present invention it is used a regression-based computational image aesthetics algorithm. It is include an image aesthetics algorithm for face aesthetics, since it has been shown that different image categories would benefit from different aesthetic metrics, and the best high level categorization regarding aesthetics is usually obtained by partitioning the set into people and non-people photos[3].

a. Face Aesthetics

There has been some research in trying to understand facial attractiveness using face features including symmetry. Unfortunately, these type of approaches would favor a character over another based on their looks, which would go against the storytelling principles. In order to avoid this kind of bias, the present invention have used a normalized face aesthetic measure ($A_f$) that takes into account normalized face sharpness, combined with the relative size, in pixels, of the face with respect to the overall image size, and smile detection.

This face aesthetic measure turns out to be very effective when comparing aesthetics of the same character's face, i.e., in the same character's face cluster. For the rest of the images with faces, but no characters in them, the algorithm rates the aesthetics of the largest face in the photo, since smaller faces might not be relevant or could have been photographed accidentally.

Below it is described the best feature combination that correlates with perceived face aesthetics:

There has been some research in trying to understand the aesthetic appeal of faces in general. Using such an algorithm would favor a character over another based on their looks, which would go against present invention goals. In order to avoid this type of bias it is used a face aesthetics algorithm ($A_f(j)$) that measures how well a certain face j is rendered through a sharpness measure ($SH_f$), combined with the relative size of the face $FS_r$, and whether a smile was detected for that face or not. This face aesthetic measure turns out to be very effective when comparing aesthetics of the same character's face in different photos.

$$A_f(j) = \rho \text{smile}(j) + \tau \frac{1}{2}(SH_f(j) + \psi FS_r(j))$$

where smile(j)=1 if a smile was detected and $$\left[\frac{1}{2}(SH_f(j) + \psi FS_r(j))\right] > 0.08,$$

since it is noted that very low quality faces are rarely selected by users, even if they are smiling; smile(i)=0 otherwise. We found that faces with smiles have tremendous importance for storytelling purposes, therefore we set $\rho=0.8$ and $\tau=0.2$. And, finally, $$\psi = 2.4 \text{ for } FS_r(j) < 0.42, \text{ and } \psi = \frac{1}{FS_r(j)} \text{ for } FS_r(j) \geq 0.42.$$

As mentioned above, this algorithm is used to rank the photos in a character cluster by the aesthetics of the character's faces. For the rest of the images with faces, but no characters in them, the algorithm rates the aesthetics of the largest face in the photo, since the other faces might, or might not, have been photographed accidentally.

b. Image Aesthetics

As previously explained, different methods of selecting representative images from within an image cluster have been proposed in the literature. In the present invention, it is taken an approach where the images within a specific event cluster are selected based on their aesthetic value, and images within a cluster are ranked based on their aesthetic value. This algorithm measures aesthetics of an image $c_j$, i.e. $A(c_j)$, on a region by region basis, and takes into account sharpness, contrast, colorfulness and exposure. For compositional purposes the algorithm also measures how well the most appealing region is isolated from the background, and its relative size. The output is normalized between 0—lowest aesthetic appeal—and 1—highest aesthetic appeal.

3.1.1.4 Visual Variety or Diversity

Each summarized act presents enough photo variety so as to allow the user to indulge in as many different aspects of the story as possible: relevant people and moments combined with aesthetically beautiful images. Therefore, the photo selection algorithm presented in the next section takes into account these three elements: relevant people and events together with aesthetically beautiful images. Before delving into the details of the approach, the rest of the used notation is summarized below:

3.1.1.5 Notation

A photo collection C is formed of $N_C=|C|$ images ($c_j$) in capture time order[4]. The photo summary, S, and the collection of photos available in the user's OSN, $C_{SN}$, are similarly defined: It is defined define next two subsets of C:

$$C=\{c_i, 0 \leq i < N_C\}.$$

(1) $C^{ch}$, which is the subset of C with all the photos that have characters in them. It is represented as a collection of M characters, or face clusters, which are obtained from the combined set $\{C \cup C_{SN}\}$, being considered a character cluster if it has at least 2 photos in it. Note that some of the character clusters are empty if there are no photos in C where a particular character appears—i.e., he/she only appears in $C_{SN}$; and (2) $C^*$, which is the subset of C that contains no near-duplicate photos, i.e., in $C^*$ all shots contain only one image.

As previously explained, C is subdivided into of a series of acts, each act into a series of scenes, and each scene into a series of shots:

$$\text{Act}=\{\text{Act}_i, 0 \leq i < N_{ActClusters}\},$$

where $N_{ActClusters}$ the number of acts in C. Scenes and shots are similarly defined.

One of the constraints imposed on the photo summary S to be created, is to preserve the temporal distribution of photos—characterized by normalized histograms—in acts, scenes and shots of the original collection C, where:

$$H_{Act}(C) = \left\{\frac{N_{Act_i}}{N_C}, 0 \leq i < N_{ActClusters}\right\}$$

is the histogram of acts in collection C. $H_{Scene}(C)$ and $H_{Shot}(C)$ are similarly defined.

Finally, the generated summary approximates the user's character normalized histogram, $H_{Character}(C \cup C_{SN})$., i.e., the summary tries to approximate the character's distribution in the combined set of the images in the collection to summarize, and the images in the user's social network.

3.1.2 Photo Selection Algorithm

Given a particular user, his/her social network photo collection $C_{SN}$ and a photo collection to be summarized C, the goal of the photo selection algorithm is to generate a photo summary S from C that contains a pre-defined number of photos $k \ll N_C$ and conveys the essence of the story to be shared by the user on his/her OSN.

It is carried out as a two-step process: first select the n people photos that appear in S (step 1 below), and then select the rest of m images up to k images (step 2 below). Both steps are greedy algorithms.

3.1.2.1 Step 1: People Photo Selection

The goal of this first step is to add to S all the needed people photos by selecting n=k*F, faces from $C^*$, being $F_r$ a face ratio obtained as a proportion of people photos that a user keeps in his social network albums plus the photo collection provided by the user to be summarized, i.e., if the user has 4 people photos out of 10, or 40%, and the current collection needs to be summarized into 20 images, then n=20*0.4=8 people photos. It is achieved according to the following steps:

1.a. Rank the face clusters in $\{C \cup C_{SN}\}$ by number of images. Select the image with the most aesthetic character face that belongs to $\{C^{ch} \cap C^*\}$ from each of the face clusters—starting from the largest cluster in the rank, which ensures coverage of relevant characters in the story while avoiding near-duplicates 1.b. From all images with characters in them that are left, the method picks one that maximizes the objective function $O_f$:

$$O_f(C,C^*,S,C_{SN}) = \alpha_f A_f(S) - \gamma_f d(H_{Character}(S), H_{Character}(C \cup C_{SN})) - \delta_f d(H_{Act}(S), H_{Act}(C^*))$$

where $A_f(S)$ is the normalized aesthetic value of the people images in the summary, and d(.) is the normalized distance metric between histograms. In combination with the images that have already been selected, it generates the maximum face aesthetics in combination with the minimum distance between the character histogram and the act histogram. More importance is given to the character histogram distance ($g_f=1$), followed by the face aesthetic value ($a_f=0.8$), and the act histogram distance ($d_f=0.5$).

For the character histogram, it is optimally selected from the character that has more photos (largest histogram bin); for the act histogram it is optimally selected from the act that minimizes the distance function (act that should be represented better in the selection, and it is actually not), but these three conditions may not be possible at the same time, therefore, the selected photo is the one that generates the highest objective function.

The last term, act histograms, is important to ensure a certain amount of temporal coverage by the characters, since images with highly aesthetic people faces may be confined to specific acts—i.e., better vs. worse light conditions.

If not enough character images are present, then the most aesthetic images of other people are selected.

If there are not enough people photos in the collection, i.e., $n < k*F_r$, the algorithm moves on to step 2.

If the algorithm runs out of character photos, then it starts selecting other people's photos (they do not have more than 1 bin count, i.e., their cluster is of only one face, or they only appear once in the whole combined collection plus social network collection)

Until, the number of pre-specified face photos n has been obtained.

3.1.2.2 Step 2: Non-People Photo Selection

The previous step has selected the first n images of S. Now the algorithm selects the rest of the k images (m-n) from $C^*$.

From here on, it is defined a large scene (L-scene) or large shot (L-shot), as scenes or shots with at least 3 images, which ensures the importance of those sub-events, and avoids potentially noisier smaller clusters.

2.a. In order to ensure good temporal coverage of all acts, the method may check that each act has one image selected. If not, it is allocated one image slot for each of the empty acts. If not enough empty slots are available, then the larger acts are favored.

2.b. Next, it is optimally allocated the rest of the empty image slots to each act by minimizing the function $O_a$:

$$O_a(C^*,S) = d(H_{Act}(S), H_{Act}(C^*));$$

For each $Act_j$ in C, the algorithm selects images until $Act_j$ has all its empty image slots filled. Images with low aesthetic value (e.g. under-exposed, blurry) are excluded from this selection process. The algorithm alternates between L-shots or L-scenes and highly aesthetic images in order to provide good selection variety, as well as never selecting more than one image from a particular scene:

2.b.1. Select the most aesthetic image from the largest unrepresented L-shot from an unrepresented scene in $Act_j$. Giving higher relevance to the largest L-shot is important since they usually represent the same object or landscape portrayed from the same viewpoint, implying a certain level of relevance for the user. Conversely, highly aesthetic images tend to appear in smaller clusters or alone, and hence the alternate search for relevant and aesthetic images.

If not available, then the algorithm selects the most aesthetic image from the largest unrepresented L-scene in $Act_j$.

If not available, move to the following step.

2.b.2. Select the most aesthetic image in $Act_j$ from any of the unrepresented scenes.

Finally, all selected images are reordered chronologically before being presented to the end user and non-selected images are discarded.

The invention claimed is:

1. A method for automatically selecting and organizing a subset of k photos, where k is a parameter defined by a user, from a set of photos provided by the user, who has an account on at least one social network, for creating a summarized photo album with a storytelling structure, the method comprises:

arranging the set of photos into a three level hierarchy, acts, scenes and shots, performing the following steps:
checking difference between photo capture times;
including a photo into a new act if checked time is higher than a predefined time;
comparing images belonging to the same act with the others of said act analysing global color similarity;
photos belonging to the same act which are similar according to the comparison of the previous step, are considered as belonging to the same scene;
applying a scale-invariant feature transform algorithm to photos belonging to same scene for identifying near-duplicates photos;
photos belonging to the same scene which are near-duplicate photos according to the previous step, are considered as belonging to the same shot;
checking whether photos are people photos or non-people photos using a face detection algorithm;
if the photos are people photos, using an image aesthetic algorithm for people photos to obtain a face aesthetic measure, being a value equal to 0 the lowest aesthetic appealing and a value equal to 1 the highest aesthetic appealing, taking into account face sharpness, relative size of a face and smile detection of the photos;
if the photos are non people photos, using an image aesthetic algorithm for non-people photos to obtain an aesthetic measure, being a value equal to 0 the lowest aesthetic appealing and a value equal to 1 the highest aesthetic appealing, taking into account sharpness, contrast, colorfulness, exposure, isolation from the background and relative size of the appealing region in the photo;
detecting characters appearing in people photos by recognizing a same face in two or more photos, being these photos either in the set of photos provided by the user, or in the photo albums said user has posted in his social network;
selecting for the subset of photos the most aesthetic photo of each character, according to the face aesthetic measures obtained before;
selecting people photos for the subset of photos, from the set of photos, until reach n photos taking into account the photos already selected in the previous step, the photos maximize the following function $O_f$:

$$O_f(C,C^*,S,C_{SN}) = \alpha_f A_f(S) - \gamma_f d(H_{Character}(S), H_{Character}(C \cup C_{SN})) - \delta_f d(H_{Act}(S), H_{Act}(C^*));$$

wherein:

C=the set of photos;

$C^*$=C but selecting only the most aesthetic photo of each shot;

S=the subset of photos;

$C_{SN}$=all user's social network photos;

$\alpha_f, \gamma_f$ and $\delta_f$=weights for each term of the $O_f$ function;

$A_f(S)$=normalized face aesthetic measure;

$H_{Character}(S)$=user's character normalized histogram of the subset of photos, representing the frequency that each character appears in the subset of photos, being a character a person who appears more than one time in the set of photos and the user's social network photos, as detected by the face clustering algorithm;

$H_{Character}(C \cup C_{SN})$=user's character normalized histogram taking into account the set of photos and user's social network photos, representing the frequency that each character appears in the set of photos and in the user's social network photos, as detected by the face clustering algorithm;

$H_{Act}(S)$=normalized histogram of the acts of the subset of photos, representing a proportion of the number of photos of the acts in S respect the total number of photos of S;

$H_{Act}(C^*)$=normalized histogram of the acts of $C^*$, representing a proportion of the number of photos of the acts in $C^*$ respect the total number of photos of $C^*$;

d( )=normalized metric distance between histograms;

n=number of people photos desired;

selecting m non-people photos for the subset of photos, from the set of photos, the m photos minimize the following function $O_a$:

$$O_a(C^*,S)=d(H_{Act}(S),H_{Act}(C^*));$$

wherein:

m=k minus n;

ordering all the selected photos of the subset of photos in chronological order;

discarding all the photos of the set which have not been selected.

2. The method according to claim 1 further comprising, if the number of character photos are less than n, selecting people photos for the subset of photos until reach n.

3. The method according to claim 2 further comprising, if the number of people photos are less than n, selecting non-people photos for the subset of photos according to their aesthetic measure until reach n.

4. The method according to claim 3 wherein n, the number of people photos desired, is obtained multiplying k by the proportion of people photos in user's social network photos and the set of photos.

* * * * *